(12) United States Patent
Pitzer

(10) Patent No.: US 6,604,429 B1
(45) Date of Patent: Aug. 12, 2003

(54) INSERT-MOLDED PRESSURE SENSOR WITH HIGH PRESSURE STAINLESS STEEL SENSING ELEMENT

(75) Inventor: Paul J. Pitzer, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/072,231

(22) Filed: Feb. 11, 2002

(51) Int. Cl.$^7$ .................................................. G01L 7/00
(52) U.S. Cl. ........................................... 73/756; 73/715
(58) Field of Search .......................... 73/756, 718, 715, 73/726, 426

(56) References Cited

U.S. PATENT DOCUMENTS

| | | | |
|---|---|---|---|
| 5,802,912 A | * | 9/1998 | Pitzer et al. ............... 439/620 |
| 5,939,637 A | * | 8/1999 | Pitzer et al. .................. 73/15 |
| 6,050,147 A | * | 4/2000 | Viduya et al. ............... 73/756 |
| 6,176,138 B1 | * | 1/2001 | Barr et al. ................... 73/756 |

* cited by examiner

*Primary Examiner*—Edward Lefkowitz
*Assistant Examiner*—Jermaine Jenkins
(74) *Attorney, Agent, or Firm*—Jimmy L. Funke

(57) ABSTRACT

An improved pressure sensor assembly incorporates a stainless steel pressure sensing element that is welded to a stainless steel pressure port insert-molded into a molded plastic pressure vessel. Sealing between the pressure port and the pressure vessel is enhanced by a O-ring seated in a groove on the outer periphery of the pressure port, or by a sealant applied to the periphery of the pressure port prior to the insert molding operation. The pressure port is insert-molded with the pressure vessel so as to expose an axial end of the pressure port having a stepped annular surface, and the pressure sensor element is welded to the exposed end of the pressure port. The plastic material of the pressure vessel extends into a central axial bore of the pressure port to minimize leakage by maximizing a potential leakage path for the medium contained by the pressure vessel, and over a shoulder of the pressure port to secure the pressure port in the body of the pressure vessel.

4 Claims, 1 Drawing Sheet

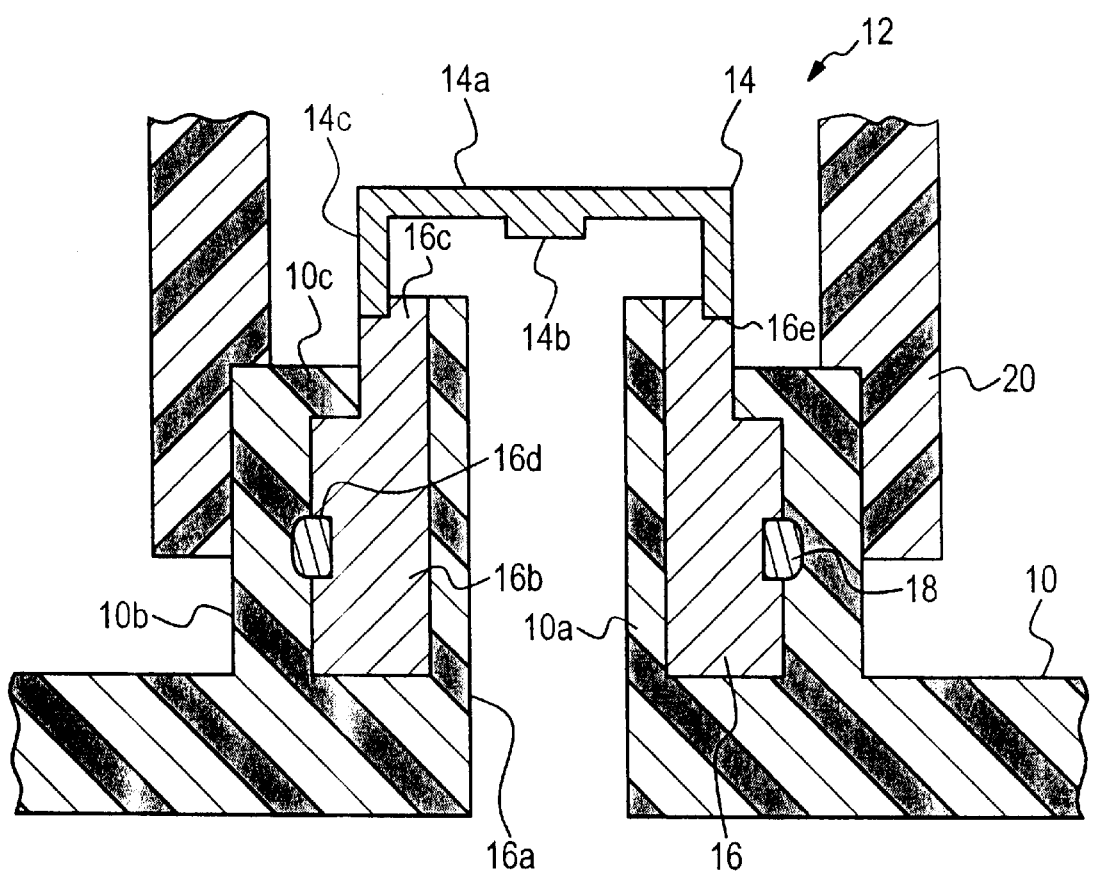

INSERT-MOLDED PRESSURE SENSOR WITH HIGH PRESSURE STAINLESS STEEL SENSING ELEMENT

TECHNICAL FIELD

This invention relates to a high pressure sensor, and more particularly to a low cost stainless steel pressure sensor assembly that is integrated into a molded plastic component.

BACKGROUND OF THE INVENTION

Motor vehicle controls frequently require measurement of certain pressure parameters such as engine oil pressure, fuel pressure, transmission fluid pressure or brake pressure. For reliability and durability, such applications usually require the use of a stainless steel pressure sensor element. In a typical application, the sensor element is welded to stainless steel a pressure port that is attached to the pressure vessel by a threaded fitting, for example. Due to the high cost of stainless steel relative to other materials, and the difficulty of machining stainless steel, various pressure port configurations have been developed for mininizing the required amount of stainless steel. See, for example, the U.S. Pat. Nos. 5,939,637 and 6,050,147, both of which are assigned to the assignee of the present invention. However, there is a growing interest in integrating a pressure sensor with the pressure vessel instead of attaching the pressure sensor to the pressure vessel by a threaded fitting, particularly in the case of molded plastic pressure vessels. Accordingly, what is needed is a pressure sensor assembly that minimizes the usage of stainless steel while being amenable to integration with molded plastic assemblies.

SUMMARY OF THE INVENTION

The present invention provides an improved pressure sensor assembly incorporating a stainless steel pressure sensing element, wherein the pressure sensing element is welded to a stainless steel pressure port that is insert-molded into a molded plastic pressure vessel. Sealing between the pressure port and the pressure vessel is enhanced by a O-ring seated in a groove on the outer periphery of the pressure port, or by a sealant applied to the periphery of the pressure port prior to the insert molding operation. According to the invention, the pressure port is insert-molded with the pressure vessel so as to expose an axial end of the pressure port having a stepped annular surface, and the pressure sensor element is welded to the exposed end of the pressure port. In a preferred embodiment, the plastic material of the pressure vessel extends into a central axial bore of the pressure port to minimize leakage by maximizing a potential leakage path for the medium contained by the pressure vessel, and over a shoulder of the pressure port to secure the pressure port in the body of the pressure vessel.

BRIEF DESCRIPTION OF THE DRAWINGS

The single drawing FIGURE is a cross-sectional view of a stainless steel pressure sensor integrated with a molded plastic pressure vessel according to this invention.

DESCRIPTION OF THE PREFERRED EMBODIMENT

Referring to the single drawing FIGURE, the reference numeral 10 designates the wall of a plastic pressure vessel containing a high pressure liquid or gaseous medium, and the reference numeral 12 generally designates a pressure sensor assembly integrated into the pressure vessel wall 10 by an insert molding operation. In addition to the pressure vessel wall 10, the pressure sensor assembly 12 includes a stainless steel pressure sensing element 14, a stainless steel pressure port 16, a sealing device such as an O-ring 18, and a terminal cover 20 which is only partially illustrated in the drawing FIGURE.

The stainless steel pressure sensing element 14 includes a cylindrical diaphragm 14a with a central mass i4b, and an annular side-wall 14c depending from the rim of diaphragm 14a. Stress sensitive elements are formed on the exposed surface of diaphragm 14a between the central mass 14b and the side-wall 14c, and connected in a bridge arrangement to detect stress due to a pressure difference across the diaphragm 14a. Typically, these elements are coupled (by wire bonding, for example) to an integrated circuit chip (not shown) which may be mounted on the outer surface of diaphragm 14a opposite central mass 14b. The integrated circuit detects and amplifies resistance variations due to the sensed pressure, and provides an electrical signal output which is coupled to metallic terminals (not shown) which may be integrated into the cover 20.

The stainless steel pressure port 16 is cylindrical cross-section, with a central axial bore 16a. The outer periphery of the pressure port 16 is stepped as shown to define upper and lower portions 16b, 16c, the lower portion 16b having a larger outside diameter than the upper portion 16c. A circumferential groove 16d formed on the outer periphery of the lower portion 16b receives the O-ring 18, and a step 16e formed on the outer periphery of the upper portion 16c accommodates the annular side-wall 14c of the sensor element 14.

During manufacture of the pressure vessel, the stainless steel pressure port 16 is secured in the mold used to form the pressure vessel wall 10 such that plastic material injected into the mold surrounds and encases the pressure port 16, leaving part of the exterior periphery of upper portion 16c exposed, as shown. In particular, the plastic material extends into the axial bore 16a as indicated by the reference numeral 10a, around the O-ring 18 and the exterior periphery of the lower portion 16b as indicated by the reference numeral 10b, and around part of the exterior periphery of the upper portion 16c as indicated by the reference numeral 10c. This minimizes leakage by maximizing a potential leakage path for the medium contained by the pressure vessel, and secures the pressure port 16 in the pressure vessel wall 10. Additionally, the injection pressure compresses the O-ring 18 into the circumferential groove 16d to maximize its sealing capability. As indicated above, the O-ring may be replaced (or supplemented) by a sealing material applied to the periphery of pressure port 16 prior to the molding operation, if so desired. When the molding operation is completed, the pressure vessel and integrated pressure port 16 are removed from the mold, and the pressure sensing element 14 is seated on the step 16e and welded in place as shown. In usage, the medium contained by the pressure vessel is applied directly to the inboard surface of the sensor diaphragm 14a via the pressure wall portion 10a.

In summary, the insert-molded pressure sensor assembly of the present invention contributes to reduced cost by minimizing the usage of stainless steel and integrating the pressure port with a plastic pressure vessel containing the medium to be measured. While the invention has been described in reference to the illustrated embodiment, it is expected that various modifications in addition to those mentioned above will occur to those skilled in the art.

Accordingly, it will be understood that sensor assemblies incorporating such modifications may fall within the scope of this invention, which is defined by the appended claims.

What is claimed is:

1. An integrated pressure vessel and pressure sensor assembly comprising:
   a pressure vessel including a molded pressure vessel wall having an opening formed therein;
   a stainless steel pressure port insert-molded in said pressure vessel wall, said pressure port being partially encased in said pressure vessel wall, and having a central axial bore that is aligned with the opening in said pressure vessel wall;
   a compressible seal element disposed between the encased part of said pressure port and the pressure vessel wall; and
   a stainless steel pressure sensor element welded to an axial end of said stainless steel pressure port that protrudes from said pressure vessel wall outside said pressure vessel, placing an inboard surface of said pressure sensor element in direct contact with a medium contained by said pressure vessel.

2. The integrated pressure vessel and pressure sensor assembly of claim 1, wherein said the encased part of said pressure port includes a circumferential groove, and said compressible seal element is an O-ring disposed in said circumferential groove.

3. The integrated pressure vessel and pressure sensor assembly of claim 1, wherein an inner periphery of said central axial bore is encased by said pressure vessel wall.

4. The integrated pressure vessel and pressure sensor assembly of claim 1, wherein said pressure port includes a first portion that is completely encased by said pressure vessel wall and a second portion that is only partially encased by said pressure vessel wall, said second portion having a width dimension that is smaller than a width dimension of said first portion.

* * * * *